United States Patent [19]

Knab

[11] 4,312,291

[45] Jan. 26, 1982

[54] TOXIC FUME ABSORBER

[76] Inventor: James V. Knab, 1640 Saginaw SE., Grand Rapids, Mich. 49506

[21] Appl. No.: 130,587

[22] Filed: Mar. 14, 1980

[51] Int. Cl.³ .............................................. B05C 15/00
[52] U.S. Cl. .................................... 118/50; 118/426; 55/387; 55/472; 98/115 LH
[58] Field of Search ........................ 118/425, 426, 50; 98/115 R, 115 LH; 55/DIG. 18, 387, 472

[56] References Cited

U.S. PATENT DOCUMENTS

| | | | |
|---|---|---|---|
| 3,376,583 | 4/1968 | Frey | 98/115 LH |
| 3,665,917 | 5/1972 | Jensen | 98/115 LH X |
| 3,719,136 | 3/1973 | Criddle | 55/473 X |
| 3,892,049 | 7/1975 | Adams, Jr. | 98/42 X |
| 4,014,658 | 3/1977 | Arendsen et al. | 98/115 LH X |
| 4,071,338 | 1/1978 | Hutter et al. | 55/316 X |
| 4,092,952 | 6/1978 | Wilkie et al. | 118/426 X |
| 4,129,426 | 12/1978 | Furasen | 55/472 X |

*Primary Examiner*—John P. McIntosh
*Attorney, Agent, or Firm*—Price, Heneveld, Huizenga & Cooper

[57] ABSTRACT

A toxic fume absorber for a source of toxic or noxious fumes is provided that is particularly adapted for absorbing fumes generated in a chemical reaction involving a change of state. The absorber comprises a manifold or trough adapted for juxtaposition adjacent the source of the toxic fumes. An upwardly facing opening to said manifold is disposed adjacent and below the source of the fumes. A hood extends from the manifold and at least partially encompasses the source of the fumes. A vacuum source is connected to the manifold for drawing fumes down from the source of the fumes and into the manifold. A modularized filter unit and vacuum source is provided for drawing effluent from the manifold, scrubbing the toxic fumes therefrom and returning the same to a controlled atmosphere.

9 Claims, 4 Drawing Figures

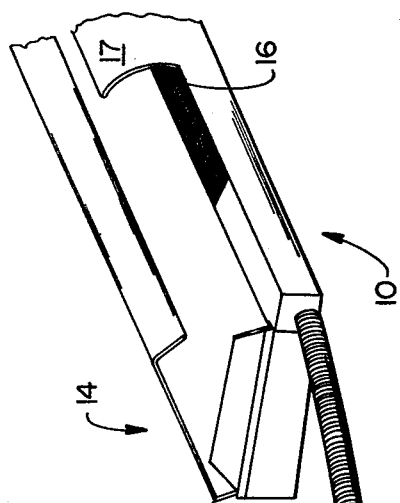
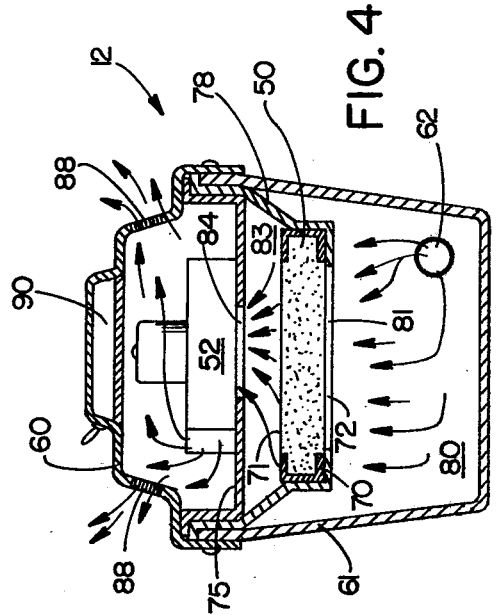
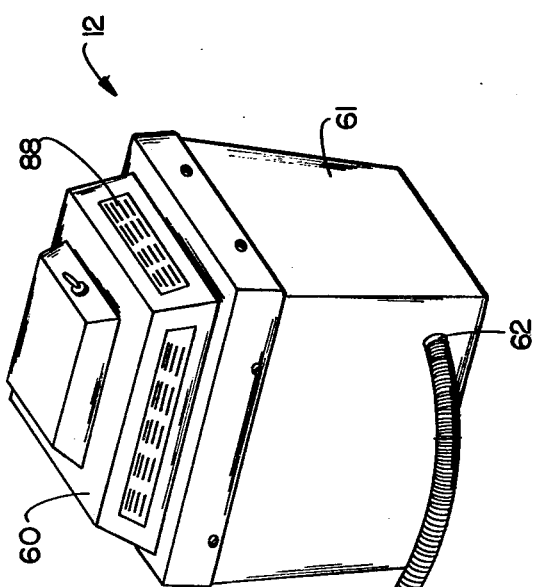
FIG. 1
FIG. 4

TOXIC FUME ABSORBER

BACKGROUND OF THE INVENTION

The invention relates generally to toxic or noxious fume absorbtion systems and more particularly, to a toxic fume absorber for use in a medical laboratory.

The generation of toxic and/or noxious fumes in a histo-pathology laboratory is a serious problem for both histotechnologists and pathologists. Many areas of the clinical laboratory are responsible for producing various noxious or toxic fumes although the histology laboratory is the greatest single source of such fumes. Specific procedures and/or processes normally carried out in the histology laboratory that contribute to fume generation include grossing, specimen processing, staining, coverslipping and specimen storage. Recent investigations by both private and governmental agencies indicate that some of the processing solutions used in these operations are suspected carcinogens.

Previous attempts to remove toxic fumes from this laboratory environment have involved the use of overhead hoods which draw large volumes of air upwardly and out of the area surrounding the source of toxic fumes. A principal drawback of this type of arrangement lies in the drawing-off of large volumes of air from the area surrounding the source of toxic fumes. Since large volumes and flow rates are involved, absorbtive filters such as an activated charcoal filter are relatively ineffective for absorbing the fumes drawn into the hood. The alternative to an absorbtive system is to vent the air and fumes drawn into the hood from the controlled atmosphere contained in the laboratory. However, with today's increasing energy costs, this presents the severe disadvantage of replacing the heated or cooled air thus exhausted from the controlled environment. It is not uncommon for such hoods to have a 2,500 cubic feet per minute (CFM) capacity and in some environments it can cost approximately $1.00 per CFM per year for energy to replace the exhausted air. Furthermore, with such notorious fume producing devices as an automated slide stainer, even with a 2,500 CFM hood disposed approximately one foot above the stainer only a 30-35% toxic fume capture rate is achieved.

Vessels are found in the prior art that include an exhaust manifold integrally formed therewith. In other cases the exhaust manifold is particularly adapted for use with a specific vessel and the manifold encompasses the vessel, establishing a peripheral opening disposed adjacent the lip of the vessel through which fumes rising from the vessel are drawn. Other devices are found employing specially adapted manifolds incorporated in the device for exhausting toxic fumes from the device. However, none of these devices are particularly adapted for solving the problem of venting toxic fumes in the environment of a histology laboratory and in particular, none of them are directed to a retrofit solution to the problem of absorbing toxic fumes generated in an automated stainer.

SUMMARY OF THE INVENTION

These and other problems in the prior art are solved by provision of a toxic fume absorber comprising a manifold or trough adapted for juxtaposition adjacent the source of toxic fumes. The manifold includes an upwardly facing opening disposed adjacent and below the source of the fumes. A hood extends from the manifold and at least partially encompasses the source of fumes. An apertured plate or the like is disposed above the manifold opening to distribute gas flow in the manifold and a vacuum source is connected to the manifold for drawing the fumes down from the source of the fumes and into the manifold. This arrangement is particularly useful for capturing toxic or noxious fumes that are generated in a chemical reaction involving a change of state requiring heat, and in fact, the present invention centers about the recognition that many of the toxic fumes generated in a clinical laboratory effervesce from a liquid to a gas. This change of state requires a latent heat of vaporization and the fumes evolving from the effervescing liquid invariably dive after they evolve from the liquid because they are cooler and more dense than the surrounding air. This fact makes it difficult for prior art hoods to draw these fumes upward and away from the source of the fumes and is believed to be the reason for the poor capture ratios achieved with prior art hoods. On the other hand, the present invention takes advantage of this characteristic of the evolving fumes by providing a trough, cup or manifold disposed in close juxtaposition immediately adjacent and under the source of the fumes for drawing the fumes downwardly and away from the source of the fumes. This system further includes filter means comprising an activated charcoal filter incorporated in a modular unit which includes the vacuum source. The modular unit is remotely located from the manifold and is adapted for use with various types of manifolds. With the manifold of the present invention, a vacuum source having a capacity as small as 25 CFM is sufficient to achieve a 90-95% capture ratio for the toxic fumes generated in an automated slide stainer. Low flow rates facilitate use of an absorbtive system for capturing or scrubbing the toxic fumes from the air drawn from the source of fumes, and thus, the toxic fume absorber of the present invention is particularly adapted for use in an environment such as a clinical laboratory having a controlled atmosphere.

BRIEF DESCRIPTION OF THE DRAWINGS

FIG. 1 is a perspective view of the toxic fume absorber of the present invention.

FIG. 4 is a sectional elevational view of a modularized filter and vacuum source for processing effluent from the toxic fume absorber manifold.

DESCRIPTION OF THE PREFERRED EMBODIMENTS

Figure 2:
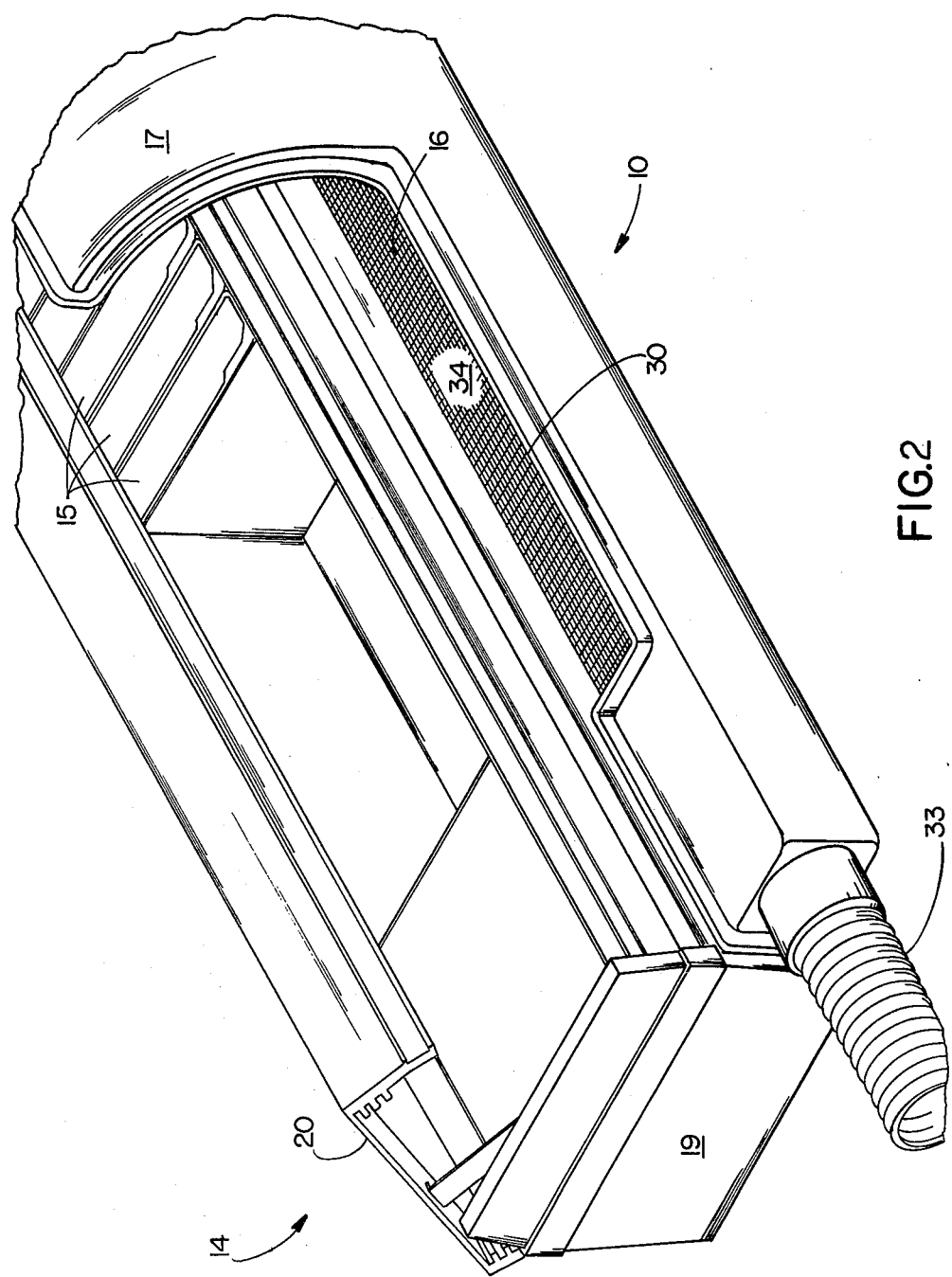
FIG. 2 is a perspective view of the manifold of the toxic fume absorber of the present invention installed on an automated slide stainer.

Referring to the Figures and in particular to FIGS. 1 and 2, a toxic fume absorber is illustrated comprising a manifold or head 10 and a modularized remotely located vacuum source and filter 12. The toxic fume absorber of the present invention is particularly adapted for disposal of toxic fumes generated in a chemical reaction involving a change of state requiring heat. Also, in the present case the toxic fume absorber is provided with a head 10 particularly adapted for use with an automated stainer 14. The automated stainer 14 depicted herein is a notorious source of toxic and irritating fumes that is present in most histology laboratories.

The stainer 14 includes a plurality of chemical baths 15 in which tissue carrying slides are sequentially immersed in an automated fashion. The baths 15 generate noxious and toxic fumes that are generally cooler than the surrounding atmosphere because of the latent heat of vaporization required to vaporize the liquid material contained in the baths. The manifold 10 is adapted for juxtaposition adjacent and below the baths 15 which are the source of toxic and noxious fumes. The manifold includes an upwardly facing opening disposed adjacent and below the baths 15. A hood 17 extends from the manifold 10 and at least partially encompasses the source of fumes 15. A vacuum source at 12 is connected to the manifold 10 by a flexible tube 18 for drawing toxic fumes down from the source of the fumes and into the manifold. Since the fumes have a natural tendency to dive after effervescing from the baths 15, the manifold 10 acts almost like a cup or collection trough into which the fumes spilling out over the baths 15 naturally tend to drop into. The fumes thus collected are easily drawn from the manifold with a small amount of ambient air by a vacuum source having a flow capacity of approximately 25 CFM. The vacuum source at 12 includes filter means for receiving the effluent from the manifold and removing the toxic fumes therefrom. The vacuum source and filter means 12 is preferably a modularized unit that may be plugged into various manifolds particularly adapted for use with specific pieces of equipment in the histology laboratory that are noxious or toxic fume sources. Once the effluent drawn from the manifold 10 is processed in the vacuum source and filter means 12, it is returned to the controlled atmosphere in the laboratory so that make-up air need not be heated or cooled to maintain the controlled atmosphere in the laboratory.

Figure 3:
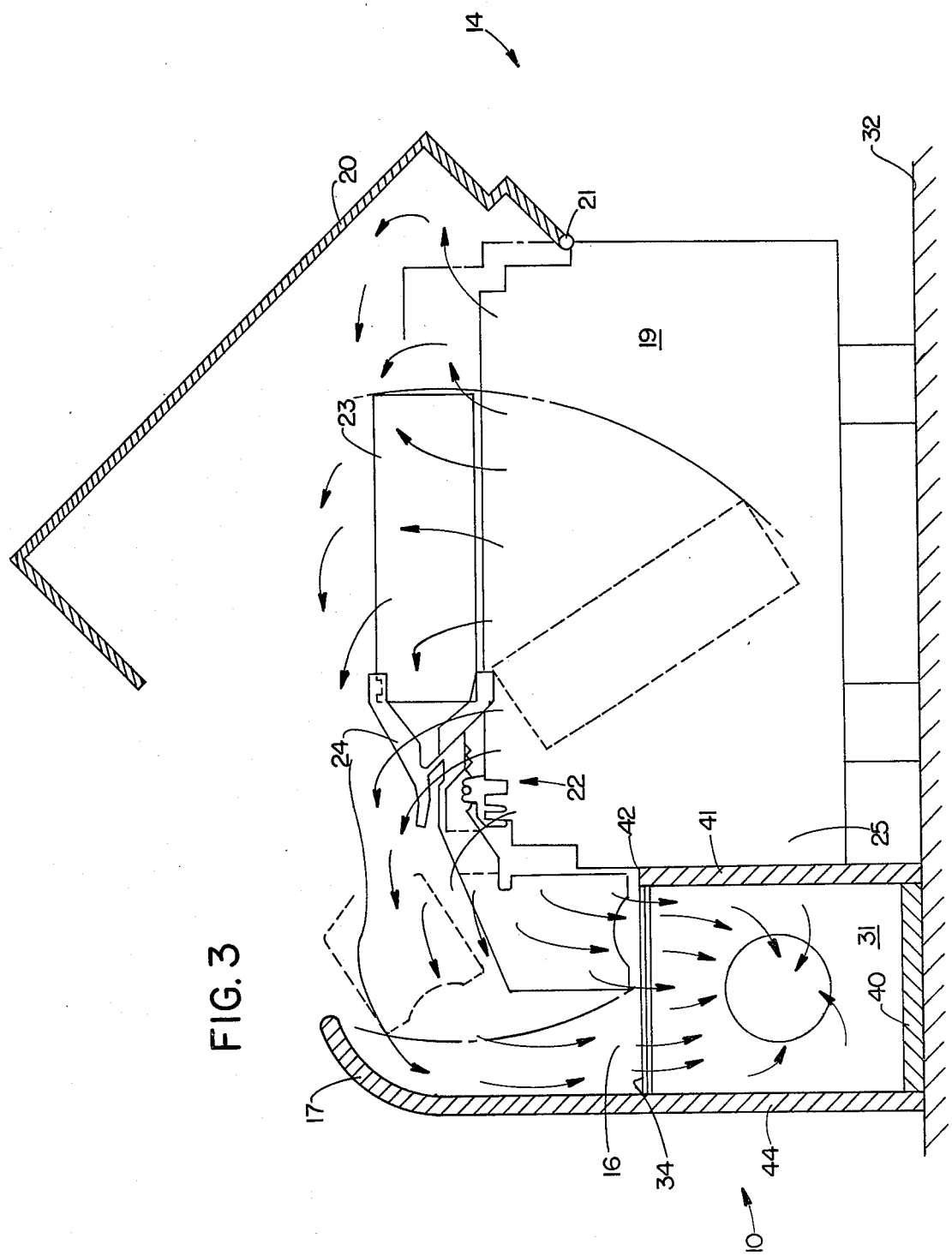
FIG. 3 is a sectional elevational view of the toxic fume absorber manifold installed on an automated slide stainer.

With particular reference now to FIGS. 2 and 3, the manifold 10 is illustrated in further detail. As previously stated, in this case, the manifold 10 is particularly adapted for use with a known source of toxic fumes in the histology laboratory comprising an automated stainer 14. The stainer 14 includes an elongate body 19 for housing a plurality of immersion baths 15. The body 19 includes an upwardly opening, longitudinally extending cover 20. The cover 20 is hinged at 21 on one of the longitudinally extending ends of the body 19 of the stainer 14. The stainer 14 includes a conveyor schematically illustrated at 22 for conveying tissue carrying slides such as the one illustrated at 23 between immersion baths 15 and dipping the same therein in a predetermined sequence. The conveyor 22 includes a plurality of clips 24 into which the slides 23 are slipped at a loading station disposed at one longitudinal end of the stainer 14. The slides 23 carry tissue samples which are then moved in a sequential fashion to the baths 15 whereupon, in a predetermined fashion, the conveyor dips the slides 23 into the baths with a pivotal motion illustrated in phantom in FIG. 3. Many slides may be processed in this manner at the same time and in the process of staining the tissue carried on the slides 23, the baths 15 continuously effervesce a plurality of toxic and noxious fumes. Because of the longitudinally extending cover 20 pivoted from one longitudinally extending side of the stainer 14 at 21, the fumes, when rising from the baths 15 have a tendency to spill out the sides and front of the stainer 14. The manifold 10 of the present invention is designed to rest in juxtaposition with the longitudinally extending side 25 of the stainer 14 directly opposite the pivot point 21 of the cover 20 of the stainer.

Thus, the upwardly facing opening 16 of the manifold 10 collects the fumes generally indicated by the arrows in FIG. 3 in a most efficient manner as they rise from the baths 15 and tend to spill over and dive down the open side 25 of the stainer 14. Even without the vacuum source which draws fumes as well as ambient air through the opening 16 of the manifold 10, the fumes emanated from the stainer 14 would have a tendency to collect in the manifold 10 which acts much like a collecting cup or trough.

The hood 17 which partially encompasses the stainer 14 prevents drafts in the laboratory from disturbing the natural progression of the fumes from the baths 15 to the manifold 10. As best illustrated in FIG. 2, the hood 17 is foreshortened at 30 on the longitudinal end of the stainer serving as the loading zone for the slides 23. The manifold 10 further comprises a longitudinally extending plenum 31 extending substantially the length of the stainer 14 and adapted to rest on a planar supporting surface such as a tabletop or the like at 32. A quick disconnect-type of fitting or nipple 33 is disposed on one of the longitudinal ends of the plenum 31. The plenum 31 is covered by a distribution plate or aperture plate 34 for distributing gas flow into the manifold 10 along the longitudinal length of the plenum 31.

With particular reference to FIG. 3, it is illustrated that the manifold 10 further comprises a four-sided longitudinally extending structure of roughly rectangular cross section defining the plenum 31. This generally rectangular structure may be suitably formed from any one of a number of polymeric materials. However, the major components of the manifold 10 are particularly adapted to be formed in a vacuum molding process. The manifold comprises a first generally horizontally extending side 40 forming the bottom of the plenum 31. This first side 40 is generally planar and supports the manifold 10 on the planar surface 32 adjacent the stainer 14. A second generally vertically oriented inboard side 41 extends upwardly to a point 42 adjacent and below the point at which the fumes spill over and out of the stainer 14. The second side 41 normally abuts the longitudinally extending side 25 of the body of the stainer 14. The second side 41 may include an adhesive strip or the like for adhesively securing the manifold to the longitudinally extending side 25 of the stainer. A third generally vertically oriented outboard side 44 extends up and over the source of toxic fumes, the upper end of the third side 44 forming the hood 17. A fourth generally horizontally extending side forms the aperture distribution plate 34 extending over the top of the plenum 31.

With particular reference now to FIG. 4, the modularized vacuum source and filter means 12 is illustrated in further detail. The filter means comprises an activated charcoal filter 50 arranged within the support housing of the modular unit 12 such that effluent from the manifold 10 is drawn therethrough before reaching the vacuum source 52 also contained therein. The exterior housing of the modularized unit 12 preferably is formed from first and second vacuum molded halves 60 and 61. The first and second halves 60 and 61 are generally rectangular in shape with the second half 61 including an inlet port 62 connected to the manifold 10 by flexible tube 18, best illustrated in FIG. 1. The filter 50 is preferably a disposable element that is easily replaced by removal of the top or first half 60 of the unit housing. A suitable filter 50 may comprise 3½ lbs of activated charcoal in a cardboard frame 70 with porous woven fiberglass windows 71 and 72. The vacuum source 52 is an electrically driven centrifugal blower mounted on a motor plate 75 and disposed in the first half 60 of the unit housing. A funnel-shaped structure 78 is mounted in the lower half 61 of the unit housing and the filter 50 is press fit therein. Effluent from the manifold 10 drawn through the inlet port 62 enters a collection chamber 80 disposed in the bottom of the lower half 61 of the housing of the modular unit 12. The effluent is then drawn upward through a window 81 in funnel-shaped member 78 and through the charcoal filter 50 by vacuum source 52. The gas exiting the filter 50 passes through a small plenum 83 before passing through port 84 in a motor plate 75 to the center of centrifugal blower 52. Gas scrubbed clean of toxic fumes is discharged from blower 52 and exits the modular unit 12 through outlet ports 88 disposed in the upper half 60 of the housing of the modular unit 12. The upper half 60 of the housing also includes a sealed compartment 90 for housing any electrical components associated with control of the electrically driven blower 52. All electrical components except the motor are thus sealed from the flow of effluent drawn from the manifold 10 to minimize the danger of fire. The modular unit 12 is designed to draw the effluent up through the filter 50 to maximize the residency time of the toxic fumes to be absorbed in the filter. Drawing the effluent upwardly through the filter is thought to increase residency times in the filter and thus increase the absorbtion efficiency of the filter since the colder more dense toxic fumes are more difficult to draw upward. Also, this effect is thought to be enhanced by the fact that most of the fumes to be absorbed have a molecular weight somewhat greater than the normal gas constituency of the atmosphere.

The above description should be considered as exemplary and that of the preferred embodiment only. The true spirit and scope of the present invention should be determined by reference to the appended claims. It is desired to include within the appended claims all modifications of the invention that come within the proper scope of the invention.

The embodiments of the invention in which an exclusive property or privilege is claimed are defined as follows.

1. A toxic fume absorber for a source of toxic fumes generated in a chemical reaction involving a change of state requiring heat, said toxic fume absorber being particularly adapted for use in an environment having a controlled atmosphere, said toxic fume absorber comprising:

an elongate manifold adapted for juxtaposition adjacent the source of the fumes;

an elongate upwardly facing opening to said manifold said opening being disposed adjacent and below the source of the fumes;

an elongate hood extending from said manifold and at least partially encompassing the source of fumes;

a vacuum source connected to said manifold for drawing the fumes down from the source of fumes and into the manifold;

filter means for receiving the effluent from said manifold, removing the toxic fumes therefrom and returning the effluent to the controlled atmosphere;

said source of toxic fumes comprising a slide processing stainer, said stainer comprising an elongate body having a plurality of immersion baths for the slides to be processed and an upwardly opening longitudinally extending cover said cover being hinged to one longitudinally extending side of said stainer, said elongate manifold being adapted for juxtaposition adjacent, parallel and below the opposite longitudinally extending side of said stainer and extending the length of said stainer for drawing toxic fumes from said plurality of immersion baths when said cover is open; and a means for removably mounting said manifold on said opposite longitudinally extending side of said stainer.

2. The toxic fume absorber of claim 1 wherein said manifold is adhesively secured to said stainer.

3. The toxic fume absorber of claim 1 wherein said stainer further includes means for conveying said slides between said plurality of immersion baths, said conveyor having a loading zone disposed on one end of said stainer said hood being foreshortened adjacent said loading zone.

4. The toxic fume absorber of claim 1 wherein said manifold comprises an elongate longitudinally extending plenum extending substantially the length of said stainer and adapted to rest on a planar supporting surface adjacent said stainer, said plenum including means for connecting said plenum to a vacuum source and an apertured plate disposed along the top thereof for distributing gas flow along the length of said plenum.

5. The toxic fume absorber of claim 4 wherein said manifold comprises a four sided longitudinally extending structure of roughly rectangular cross section defining said plenum, said manifold further comprising a first generally horizontally extending side forming the bottom of said plenum and providing means for resting said manifold on a planar supporting surface, a second generally vertically oriented inboard side extending upwardly to a point adjacent and below the source of toxic fumes, a third generally vertically oriented outboard side extending up and over the source of toxic fumes the upper end of said third side forming said hood and a fourth generally horizontally extending side said fourth side extending over the top of said plenum and forming said apertured plate.

6. The toxic fume absorber of claim 5 wherein said manifold is formed from a molded polymeric material.

7. The toxic fume absorber of claim 1 wherein said filter means comprises an activated charcoal filter, said charcoal filter being remotely located with said vacuum source such that the effluent from said manifold is drawn through said filter before reaching said vacuum source and being discharged to the controlled atmosphere.

8. The toxic fume absorber of claim 7 wherein said filter means and said vacuum source comprise a modularized unit for use with different manifolds said modularized unit being connected to said manifold with a detachable flexible tube.

9. The toxic fume absorber of claim 8 wherein said charcoal filter is disposed below said vacuum source in said modularized unit, the effluent from said manifold being drawn upwardly through said charcoal filter to increase the residency times of the toxic fumes therein.

* * * * *